Nov. 20, 1928.  
G. W. BLAIR  
1,692,196  
SLIDER OPERATED FASTENER  
Filed March 25, 1926
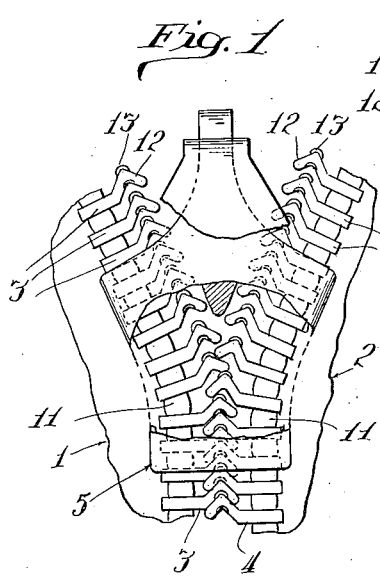
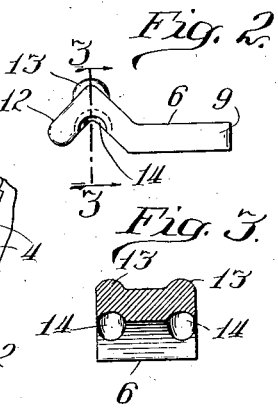
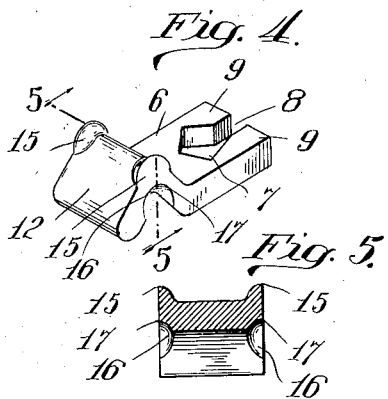
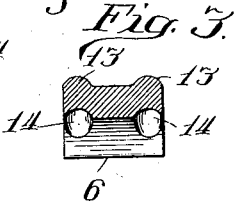
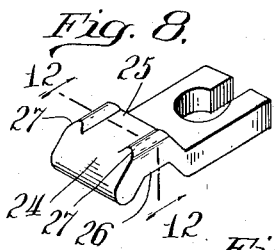
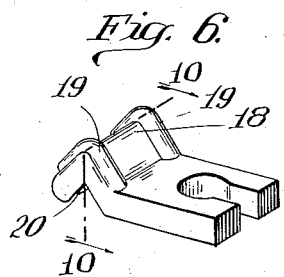
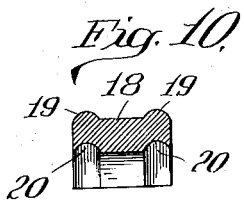
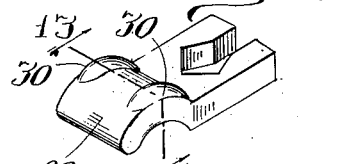
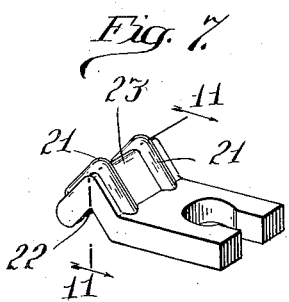
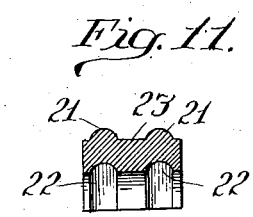
Inventor  
George W. Blair  
By Eugene M. Giles  
Attorney.

Patented Nov. 20, 1928.

1,692,196

UNITED STATES PATENT OFFICE.

GEORGE W. BLAIR, OF MISHAWAKA, INDIANA, ASSIGNOR TO MISHAWAKA RUBBER AND WOOLEN MANUFACTURING COMPANY, OF MISHAWAKA, INDIANA, A CORPORATION OF INDIANA.

SLIDER-OPERATED FASTENER.

Application filed March 25, 1926. Serial No. 97,250.

My invention relates to fasteners of the type wherein opposed series of fastener elements are interlocked and released by movement of a cam members or slider therealong.

In fasteners of this character it is necessary to construct the elements so that they are securely interlock against direct separation or pulling apart and also to avoid any possipility of relative lateral movement or side slipping which is most likely to occur when the fastener is doubled over.

The principal objects of my invention are to provide a fastener wherein the elements interlock so securely that they will not disengage except by operation of the cam member or slider; to provide a simple form of element which may be conveniently manufactured; to interlock the elements against direct separation by an arched formation which extends transversely of the element and nests between corresponding arched portions of the adjoining elements; to prevent side slipping of the elements by interengaging parts which interlock more securely when the fastener is doubled over; to utilize ribs and recesses or other offset formations on the arched portion of the element to prevent side slipping; and in general to provide fastener elements of simple form which afford a secure and dependable connection and are readily interlocked and released by movement of the operating cam member or slider.

On the drawings:

Fig. 1 is a plan view of a fragmentary portion of the fastener with portions of the operating cam or slider broken away;

Fig. 2 is a side view of one of the fastener elements;

Fig. 3 is a sectional view on the line 3—3 of Fig. 2;

Fig. 4 is a perspective view of a slightly modified form of the element shown in Figs. 2 and 3;

Fig. 5 is a sectional view on the line 5—5 of Fig. 4;

Figs. 6, 7, 8 and 9 are perspective views of other modifications of the fastener element; and Figs. 10, 11, 12 and 13 are similar sectional views respectively on the lines 10—10 of Fig. 6, 11—11 of Fig. 7, 12—12 of Fig. 8 and 3—13 of Fig. 9.

Referring to the drawings, the numerals 1 and 2 indicate fragmentary portions of the parts which are to be connected together, said parts having the series of elements 3 and 4 respectively secured to the edges thereof and adapted to be interlocked and released by movement of a cam member or slider 5 along the two series of elements. The elements 3 and 4 are alike and each consists of an elongated flat plate 6 which is formed at one end in any suitable manner for attachment to the parts 1 and 2. For this purpose the element 6 may be formed with an aperture 7 and slot 8 leading outwardly therefrom forming opposed jaws 9 for clamping on the enlarged edge 11 of the parts 1 and 2.

The outer or projecting portion of the element 6 is arched as indicated at 12, said arch formation extending transversely from edge to edge of the element to form a transverse elevation at one side and a corresponding transverse recess or channel at the other side so that when the outer portion of the element is inserted between the outer portions of elements of the other series, the arched portion 12 engages between corresponding arched portions of the other elements as indicated at the lower part of Fig. 1 and securely interlocks the elements against direct separation.

For preventing lateral relative movement or side slipping of the interlocked elements, any suitable means may be provided as for example, the bumps or projections 13 adjacent the ends of the raised side of the arched portion 12 and corresponding recesses 14 at the under side of the arched portion 12. When the elements 3 are interlocked with the elements 4, the bumps or projections 13 of each element seat in the recesses 14 of the adjoining element of the other series and the elements are thus interlocked against lateral relative movement or side slipping. Moreover, bending or doubling over of the fastener merely tends to interlock the projections 13 and recesses 14 at the inner side of the bend more securely so that any possibility of the fastener coming apart or being released except through the operation of the slider 5, is entirely avoided.

Another form in which a fastener may be constructed embodying my invention is shown in Figs. 4 and 5, wherein the projections 15 are at the extreme ends of the arched portion 12 and the recesses 16 are entirely open at their outer sides instead of being provided with depending or overhanging edges at the outer sides as shown particularly in Fig. 3. In the normal interlocked position of the elements the projections 15 are engaged sufficiently with the recesses 16 to hold the elements against side slipping and when the fastener is doubled over the recess 16 clamps against the corresponding projection 15 and rocks thereon so that the outer edge 17 of the recess 16 hooks over the projection 15 and insures a positive interlocking to prevent side slipping.

There are various other forms in which my fastener elements may be made, some of such forms being shown in Figs. 6 to 13 inclusive.

In Figs. 6 and 10, the element is formed with a transversely extending arched portion 18 similar to the elements of Figs. 2 and 4, but differs from the latter elements in having ribs 19 and channels 20 extending respectively over and under the arched portion 18 in the direction of the length of the element. The arched portion of the various elements may be shaped otherwise than as in Figs. 2, 4 and 6, examples of such other forms being shown in Figs. 8 and 9.

In Figs. 7 and 11, ribs and channels 21 and 22 are provided, but are spaced inwardly somewhat from the extremities or ends of the arched portion 23.

In Figs. 8 and 12, the arched portion 24 of the element is semi-hexagonal in form so that flat top and bottom faces 25 and 26 respectively are provided and these faces have the ribs and channels 27 and 28 respectively at their ends.

The element of Figs. 9 and 13 is similar to that last described except that the arched plate 29 is rounded or substantially semi-circular in section and has elongated bumps or projections 30 on the upper side adjacent the ends of the arched portion with corresponding recesses 31 on the under side.

With the various forms of elements shown and described, it will be observed that the interlocking against direct separation or pulling apart is effected by the arched formation which extends from edge to edge of the element while the interlocking to prevent lateral relative movement or side slipping is accomplished by projections or ribs on the arched portion engaging corresponding recesses or channels on the under side of the arched portion. The projections or ribs to prevent side slipping or lateral relative movement of the elements are preferably located at or closely adjacent the edges of the element and as a result of such arrangement any sidewise slipping of the elements out of engagement, even when the fastener is doubled over to the fullest extent possible, is rendered impossible. Bending or doubling over of the fastener tends to spread the elements apart at the outer side of the bend and will to the same extent separate the sidewise interlocking projections or ribs and recesses or channels at that side of the element. On the other hand the sidewise interlocking projections or ribs and recesses or channels at the inner side of the bend are at such time clamped tighter and tighter together as the fastener is bent or doubled over to a greater extent so that as the tendency to slip sidewise is increased by the sharpness of the bend, the interlocking effect against side slipping is correspondingly increased and security against side slipping is thoroughly assured.

While I have shown and described my invention in a preferred form, I am aware that various changes and modifications may be made without departing from the principles of my invention, the scope of which is to be determined by the appended claims.

I claim as my invention:

1. In a fastening device of the class described, the combination of opposed series of fastener elements and a slider operable therealong for interlocking and releasing same, each element having an arched offset extending transversely thereof from one lateral edge to the other lateral edge of the element and terminating at each lateral edge in an added offset forming an added recess in the reverse side of the plate adjacent and opening through the corresponding lateral edge of the element.

2. In a fastening device of the class described, the combination of a double series of fastener elements having means for attachment to pieces of material to be connected together, each of said elements having an arch formation providing a transverse groove in one face and a transverse projection at the other face, and a slider adapted by movement along the series to bring said transverse grooves and projections into interlocking engagement, each lateral edge portion of each of said elements being provided at the highest point of the arch with a longitudinally extending projection at one face and an oppositely disposed longitudinally extending groove in the other face, the longitudinally extending projection of one element being adapted by engagement with the longitudinally extending groove of the adjacent element of the other series to hold said elements from slipping transversely with respect to each other, and said longitudinally extending projections and grooves being adapted by the engagement of their end portions at opposite sides of the arch to prevent any substantial angular movement of one element with respect to the adjacent element longitudinally of the series.

3. In a fastening device of the class described, the combination of a double series of fastener elements having means for attachment to pieces of material to be connected together, the end portions of said elements having an arch formation arranged for permitting the elements to nest with each other and serving when so nested closely together to prevent angular movement of one element longitudinally of the series with respect to the adjacent element, and a slider adapted by movement along the series to bring said elements into nesting arrangement, each lateral edge portion of each of said elements being provided with a longitudinally extending projection at one face and a longitudinally extending groove in the other face, the longitudinally extending projections and grooves of adjacent elements being adapted by engagement with each other to hold said elements from slipping transversely with respect to each other out of said nesting arrangement.

4. In a fastening device of the class described, the combination of a double series of fastener elements having means for attachment to pieces of material to be connected together, the end portions of said elements being arched and arranged for permitting the elements to nest with each other, each of said arches comprising substantially straight portions in angular position with respect to each other at the opposite sides of the arches whereby when the arches are nested closely together said elements are held against angular movement with respect to each other longitudinally of the series, and a slider adapted by movement along the series to bring said elements into nesting arrangement, each lateral edge portion of each of said elements being provided adjacent to the angle of the arch with a longitudinally extending projection at one face of the element and a longitudinally extending groove in the other face, the longitudinally extending projections and grooves of adjacent elements being adapted by engagement with each other to hold said elements from slipping transversely with respect to each other out of said nesting arrangement.

GEORGE W. BLAIR.